United States Patent [19]

Giles, Sr. et al.

[11] Patent Number: 4,854,949
[45] Date of Patent: Aug. 8, 1989

[54] APPARATUS FOR COOKING FOOD INCLUDING A VENTLESS EXHAUST SYSTEM

[75] Inventors: William O. Giles, Sr., Montgomery; William T. McNeal, Pratville; Ted W. Giles, Montgomery, all of Ala.

[73] Assignee: Giles Enterprises, Inc., Montgomery, Ala.

[21] Appl. No.: 183,681

[22] Filed: Apr. 19, 1988

[51] Int. Cl.⁴ ............................................. B03C 3/01
[52] U.S. Cl. ........................................ 55/126; 55/316; 55/467; 55/DIG. 36; 99/403; 126/299 D
[58] Field of Search .................................. 55/124–126, 55/316, 467, DIG. 36; 99/336, 403, 408; 126/299 D

[56] References Cited

U.S. PATENT DOCUMENTS

| | | | |
|---|---|---|---|
| 3,744,216 | 7/1973 | Hallman | 55/126 X |
| 3,785,124 | 1/1974 | Gaylord | 55/126 X |
| 3,952,640 | 4/1976 | Kuechler | 55/126 X |
| 4,489,646 | 12/1984 | Schmidt et al. | 99/408 X |
| 4,489,647 | 12/1984 | Stamps et al. | 99/336 |
| 4,666,478 | 5/1987 | Boissinot et al. | 126/299 D X |

Primary Examiner—Charles Hart
Attorney, Agent, or Firm—Berman, Aisenberg & Platt

[57] ABSTRACT

Apparatus for cooking food includes a ventless exhaust system whereby a fan pulls heated air through a filter system which includes an aluminum grease filter, an electrostatic precipitator, a flame arrester and a charcoal filter. A fire extinguisher is also included. Cleaned air may be recirculated within the building. The apparatus may be operated either as an open-faced, unpressurized fryer or as a pressurized or semi-pressurized fryer.

7 Claims, 2 Drawing Sheets

APPARATUS FOR COOKING FOOD INCLUDING A VENTLESS EXHAUST SYSTEM

FIELD OF THE INVENTION

The invention relates to ventless exhaust systems for recirculating air.

BACKGROUND OF THE INVENTION

Prior known systems for exhausting food fumes and smoke from cooking apparatus, such as food fryers, required the exhaust to be vented out of the building since it was not formerly possible to cleanse grease-laden air sufficiently for recirculation. Stamps, U.S. Pat. No. 4,489,647, describes a ventless exhaust system only for use with an enclosed, small-scale, unpressurized, food frying and dispensing apparatus for cooking individual portions of food for which a short cooking cycle is sufficient and only a small quantity of exhaust gas is produced.

The patent to Glover, U.S. Pat. No. 3,747,301, describes a smoke eliminator for use above burners or grills, but does not address the problem of cleaning exhaust from large scale fryers sufficiently for recirculation. Gaylord, U.S. Pat. No. 3,785,124, includes a grease extractor hood section and a deodorizing section in order to purify air being vented to the outside atmosphere. King, U.S. Pat. No. 3,907,525 describes a similar system for cleaning air before exhausting it to the atmosphere. The patent to Ebert, U.S. Pat. No. 3,744,217, describes a high-voltage ozone-free electrostatic air filter suitable for use over a kitchen oven.

Other patents, such as those to Kuechler, U.S. Pat. No. 4,952,640 and 4,085,736 and 4,250,870, describe a vortex system for exhausting air.

SUMMARY OF THE INVENTION

Apparatus for cooking food, particularly for deep frying, includes a container for holding oil in which the food is fried, and means for heating the oil and controlling the oil temperature at a level suitable for frying. Ventless air filtering apparatus is located substantially above the oil container, and heated air rising from the container during cooking is drawn through the filter apparatus by a fan which circulates the heated, grease-laden air through the filter apparatus, and then recirculates cleaned air into the room. The filter apparatus, which may be positioned at an angle between about 5 degrees and 30 degrees to the horizontal includes an aluminum filter for trapping grease and moisture, an electrostatic precipitator for removing particulates, a flame arrester for preventing passage of flames, and a charcoal filter for deodorizing the air. The apparatus may also include a fire extinguisher as a safety precaution.

An object of the invention is to provide a ventless exhaust system for a full-sized chicken fryer.

A further object of the invention is to provide apparatus for cleaning air rising from a food fryer, enabling the cleaned air to be recirculated.

BRIEF DESCRIPTION OF THE DRAWINGS

FIG. 2 is a side view, partly in cross section, of the food fryer of FIG. 1, with the lid on.

DETAILED DESCRIPTION OF THE INVENTION

Ventless exhaust hoods have heretofore only been known for small-scale, unpressurized apparatus, such as apparatus for cooking individual portions of fried food. Large scale frying apparatus produces substantial quantities of grease-laden heated air which rises from the frypot. Previous exhaust systems for large scale fryers have cursorily cleaned the air before venting it to the atmosphere. Such systems, which do not recirculate the air but vent it to the atmosphere, provide an adequate quality of air within the building, but the atmosphere surrounding the building from which such cooking fumes are discharged may not meet air quality standards. Moreover, in high-rise buildings, the cost of venting fumes to the atmosphere is very high, due to the cost of ductwork through a tall building.

Figure 1:
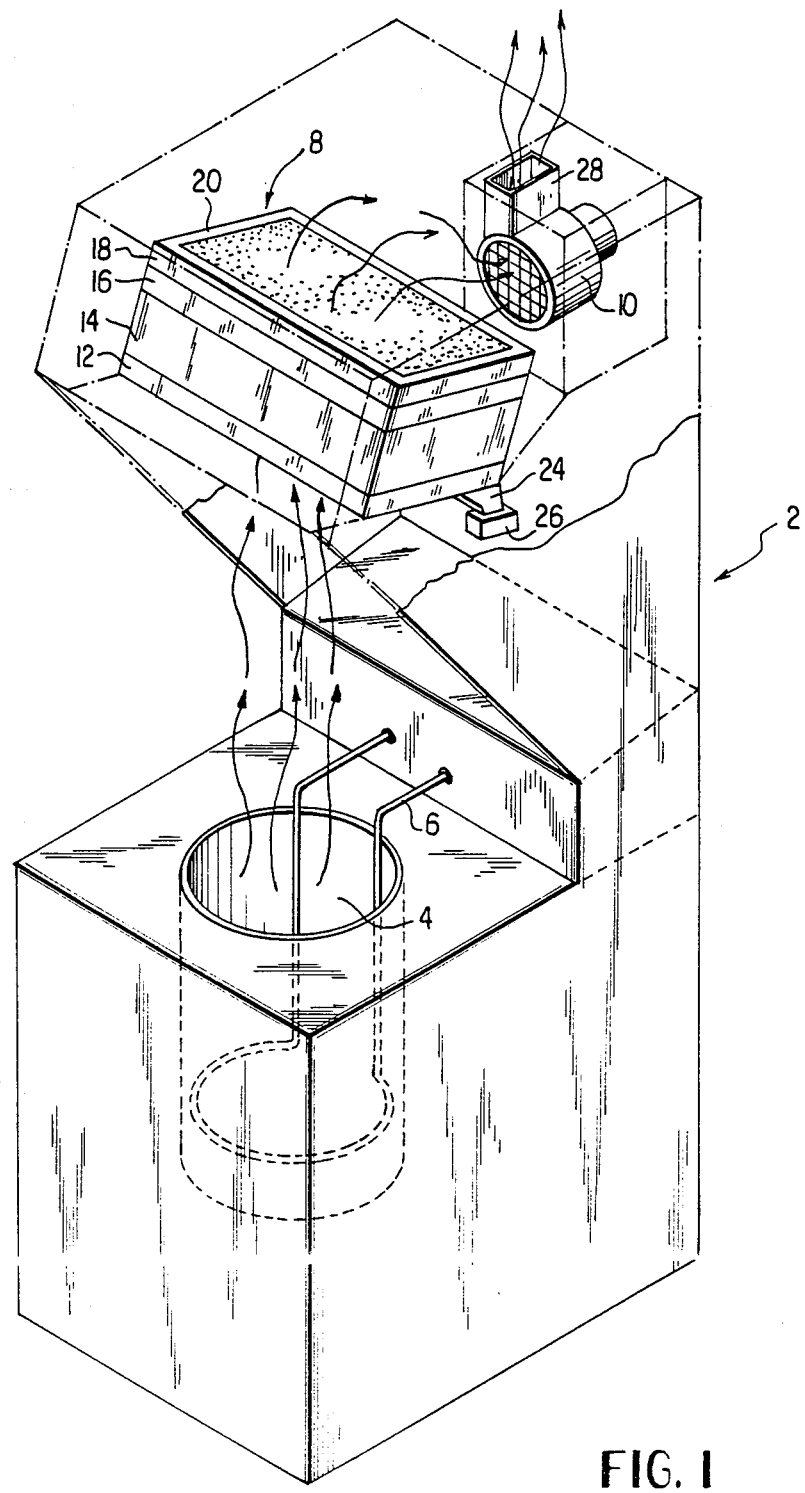
FIG. 1 is a perspective view, partly cut away, showing a food fryer with the lid off and ventless exhaust system of the invention.
Figure 2:
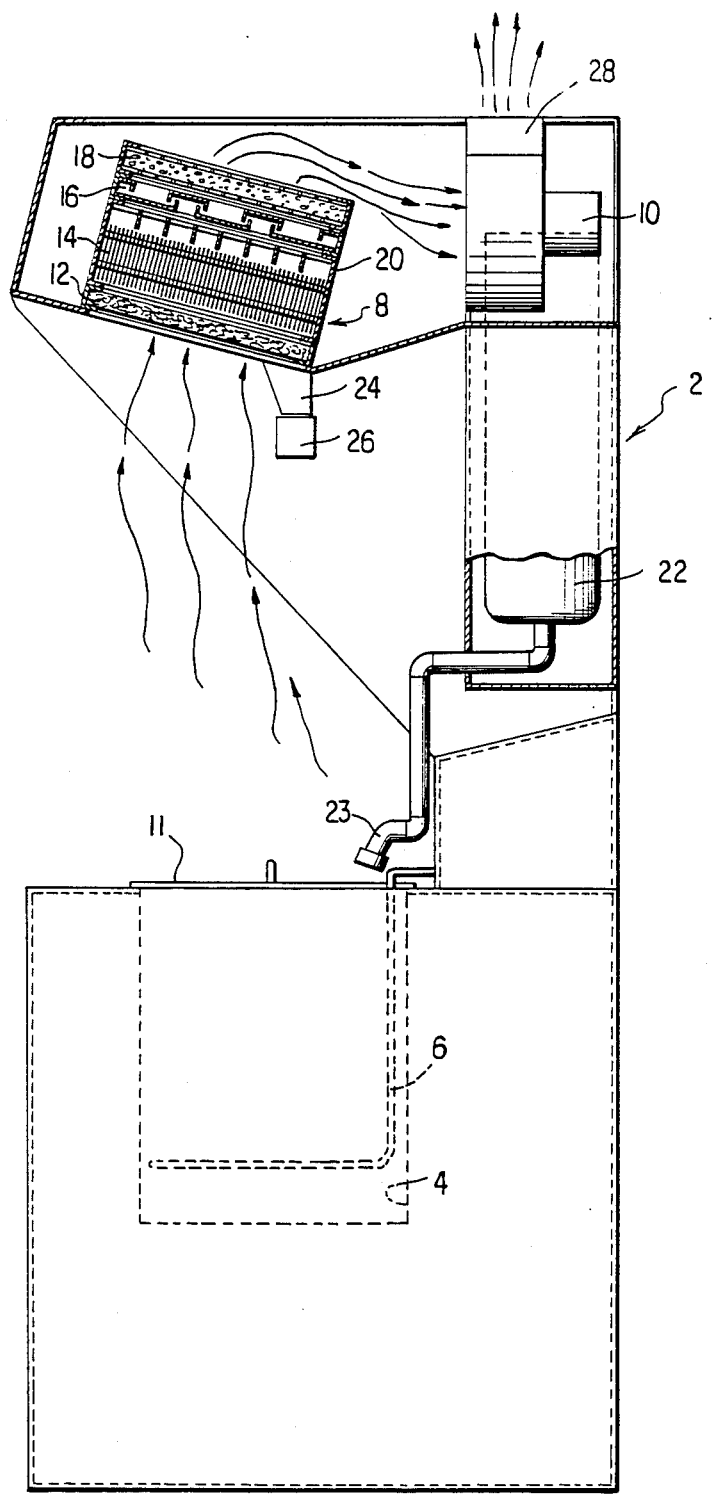

With reference to FIGS. 1 and 2, in which like numerals represent like parts, food cooking apparatus 2 includes frypot 4, the contents of which are heated by means of heating element 6. In a typical example, a wire basket containing breaded chicken pieces is lowered into frypot 4 which contains oil heated sufficiently for frying chicken. Heated grease-laden air rising from the hot oil in the frypot rises into the path of air being exhausted through filter system 8 by exhaust fan 10. Apparatus 2 may be operated either pressurized, with lid 11 in place, or unpressurized, without using lid 11. Low pressure operation (2-5 lb./sq. in.) is preferred, but full pressure (up to 15 lb./sq. in.), or unpressurized, open-faced frying may also be used. Lid 11 may be automatically seated using an electrically operated elevator which also raises and lowers the frypot.

Filter system 8 includes grease filter 12, electrostatic precipitator 14, flame arrester 16 and charcoal filter 18. These filters are positioned in a housing 20 which may be positioned at an angle between about 5 degrees and 30 degrees to the horizontal, sloping upward and substantially over the frypot. The apparatus may also include a fire extinguisher 22 having an outlet 23 close to frypot 4, ready to extinguish flames from burning oil should a fire occur. Should the fire extinguisher need to be used, fire extinguishing material is directed through outlet 23 into frypot 4. As a further precaution flame arrester 16, discussed in further detail below, is positioned in the filter system 8 to stop the passage of any flames through the filter system so that flames do not reach fan 10.

Aluminum filter 12 is mounted at an angle between about 5 and 30 degrees, preferably between 10 and 25 degrees, and condenses the moisture content in the air rising from the frypot into small droplets. The aluminum filter also traps grease impurities in the air rising from the frypot. Moisture condensed by filter 12 drains through channel 24 to be collected in container 26.

Electrostatic precipitator 14 is a known electronic cell such as is made, for example, by Honeywell, Inc. (Minneapolis, Minn.). The precipitator is optimally operated at about 90-95% of its capacity,.

Flame arrester 16 is a fire retarder and/or extinguisher which includes interlocking metal flanges forming channels. Such a flame arrester traps and extinguishes any flames, due to lack of air supply to the flames, since the passageway for flames through the flame arrester is indirect, and any flames must reverse direction through many bends before reaching the fan.

This tortuous path tends to extinguish flames by cutting off the air supply to the flames.

Charcoal filter 18 includes a perforated case containing granular charcoal. As the heated air passes through the charcoal filter, the air is deodorized before being returned to the room.

Filter 12, electrostatic precipitator 14, flame arrester 16 and charcoal filter 18 may be arranged in a different sequence, if required. In a non-limiting example, flame arrester 16 may be positioned adjacent filter 12. In aother example, filter 12 and flame arrester 16 are combined into a single unit which is preferably located in the lowest filter position illustrated for aluminum filter 12 in FIGS. 1 and 2.

Fan 10 is a continuously operating fan, such as a squirrel fan, and the speed of operation of the fan is such that air flow through all sections of filter system 8 is controlled and air from outlet 28 of fan 10 is of good quality so that it may be discharged back into the internal room space where the apparatus 2 is being operated, without needing to be discharged to the outside atmosphere. Moreover, the system may be an open, unenclosed system, and the fan pulls the air rising from the frypot through the exhaust system before recirculating cleaned air. A typical fan operates at 1400 rpm and pulls 1157 cu. ft. air/min. through the fan.

This ventless exhaust system may be used with a non-pressure vessel frypot operated with its lid either on or off, or with a pressurized vessel frypot operated with its lid on at pressures up to 15 lbs/sq in. In a preferred example, a semi-pressurized frypot is used, at about 2-5 lb./sq. in. pressure.

Test results of air quality of grease-laden air discharged from the fan show 0.1 gm. impurities/cu. ft. This is well within the Underwriters Laboratory limits of air quality suitable for recirculating back into a building interior space.

Fire extinguisher 22 is connected to an electrical sensor so that when the fire extinguisher canister begins to discharge, the electric circuit to the fryer is automatically broken.

The ventless hood system of the invention obviates the need for providing an up-draft vent system through a building. This enables a system of the invention to be used in a high-rise building since air leaving the unit is sufficiently purified to be recirculated directly back into the interior space. The chicken fryer of the invention is a free-standing unit which needs no special wiring and no special exhaust system. In a preferred unit, the oil is filtered after frying several batches, and reused.

While the invention has been described above with respect to certain embodiments thereof, it will be appreciated that variations and modifications may be made without departing from the spirit and scope of the invention.

What is claimed is:

1. Apparatus for cooking food comprising:
  container means for holding oil;
  heating means for heating the oil in the container means;
  air filter means for treating air drawn therethrough located substantially above the container means and sloping upwardly;
  fan means for circulating heated air rising from the heated oil in the container means through the filter means and for recirculating filtered air back into interior room space;
  wherein the filter means comprises:
  electrostatic precipitator means for removing particulates from the air,
  charcoal filter means for deodorizing the air,
  aluminum filter means for condensing moisture from the air, and
  flame arrester means for preventing passage of fire through the fan means.

2. Apparatus of claim 1 wherein the electrostatic precipitator means is operated at 90-95% capacity.

3. Apparatus of claim 1 wherein the container means further comprises means for pressurized cooking.

4. Apparatus of claim 3 comprising means for pressurizing the container means up to about 15 lb./sq. in pressure.

5. Apparatus of claim 1 further comprising fire extinguisher means adjacent the container means for extinguishing flames.

6. Apparatus of claim 1 wherein the heated air is exhausted through the aluminum filter means, electrostatic precipitator means, flames arrester means, charcoal filter means and fan means in sequence.

7. Apparatus of claim 1 wherein the filter means is positioned at an angle between about 5 degrees and 15 degrees to the horizontal, sloping upwards toward a front portion of the apparatus.

* * * * *